US008762505B2

(12) United States Patent
Kutan et al.

(10) Patent No.: US 8,762,505 B2
(45) Date of Patent: Jun. 24, 2014

(54) DEFINITION CONFIGURATION AND ADMINISTRATION OF DISTRIBUTED SERVER SYSTEMS THROUGH STRUCTURED DATA MODEL

(75) Inventors: Serkan Kutan, New York, NY (US);
Shaun Cox, Redmond, WA (US);
Erdinc Basci, Redmond, WA (US);
Vadim Eydelman, Bellevue, WA (US);
Bimal Mehta, Sammamish, WA (US);
Nirav A. Kamdar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 525 days.

(21) Appl. No.: 12/814,570

(22) Filed: Jun. 14, 2010

(65) Prior Publication Data
US 2011/0307587 A1    Dec. 15, 2011

(51) Int. Cl.
*G06F 15/177* (2006.01)

(52) U.S. Cl.
USPC .................. 709/222; 709/203; 703/1; 703/21

(58) Field of Classification Search
USPC ........................................................ 709/222
See application file for complete search history.

(56) References Cited

U.S. PATENT DOCUMENTS

| 7,376,671 B2 | 5/2008 | Simpson |
| 7,630,877 B2 | 12/2009 | Brown et al. |
| 7,669,226 B2 | 2/2010 | Bhide et al. |
| 2006/0271341 A1* | 11/2006 | Brown et al. ...................... 703/1 |
| 2008/0243993 A1 | 10/2008 | Wang et al. |
| 2009/0327301 A1 | 12/2009 | Lees et al. |

OTHER PUBLICATIONS

Choi, et al., "Design and Implementation of Xml-based Configuration Management System for a Distributed Systems", Retrieved at <<http://ieeexplore.ieee.org/stamp/stamp.jsp?tp=&arnumber=1317771 >>, NOMS, IEEE/IFIP Network Operations and Management Symposium, Apr. 23, 2004, pp. 831-844.
Carrilho, et al., "Distributed Policy-based Network Management with NETCONF", Retrieved at <<http://home.intekom.com/satnac/proceedings/2006/papers/No%20292%20-%20Carrilho.pdf >>, Southern African Telecommunications and Applications Conference (SATNAC 2006), Sep. 4-6, 2006, pp. 6.
"Intel® XML Configuration Manager: Simplify XML policy management", Retrieved at <<http://www.developers.net/filestore2/download/1719>>, Retrieved Date: Apr. 16, 2010, pp. 2.
"Server Management", Retrieved at <<http://www.microsoft.com/systemcenter/en/us/configuration-manager/cm-server-management.aspx >>, Retrieved Date: Apr. 17, 2010, pp. 2.

* cited by examiner

*Primary Examiner* — Hua Fan
(74) *Attorney, Agent, or Firm* — Andrew Smith; Jim Ross; Micky Minhas

(57) ABSTRACT

A platform for manipulating data associated with defining, deploying, and administering distributed server systems utilizes a structured data model with a flexible replication mechanism, a set of schemas, and an object model to manipulate system topology, configuration (settings), and policies. A scoping mechanism for characteristics of the settings, policies, and resolution is provided in addition to the data model along with an authorization mechanism for single and multi-tenant environments.

17 Claims, 6 Drawing Sheets

DEFINITION CONFIGURATION AND ADMINISTRATION OF DISTRIBUTED SERVER SYSTEMS THROUGH STRUCTURED DATA MODEL

BACKGROUND

As an alternative to Public Switched Telephone Network (PSTN) systems, cellular phone networks have proliferated over the last decades, where users with cellular phones have access to one or more networks at almost any location. Also a recent development is the wide spread use of Voice over IP (VOIP) telephony, which uses internet protocol (IP) over wired and wireless networks. With the availability of such diverse types of communication networks and devices capable of taking advantage of various features of these networks, enhanced communication systems bring different communication networks together providing until now unavailable functionality such as combining various modes of communication (e.g. instant messaging, voice calls, video communications, etc.). This technology is also referred to as unified communications (UC). A network of servers manages end devices capable of handling a wide range of functionality and communication while facilitating communications between the more modern unified communication network devices and other networks (e.g. PSTN, cellular, etc.).

Enhanced communication systems providing multi-modal communications are distributed server systems, which are relatively complex to define, deploy, and administer due to number of machines and workloads involved. Lack of a centralized management mechanism may require administrators to be aware of multiple controls to make changes in the system. As such a system evolves, new workloads are added. The increased complexity may cause mistakes to be made, which in turn may cause service outages. Maintenance cost may also increase resulting in reduced return on investment for the system owners.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a platform for manipulating data associated with defining, deploying, and administering distributed server systems. A structured data model is provided with a flexible replication mechanism, a set of schemas, and an object model to manipulate system topology, configuration (settings), and policies. According to some embodiments, a scoping mechanism for characteristics of the settings, policies, and resolution may be provided in addition to the data model. An authorization mechanism for single and multi-tenant environments may also be employed.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
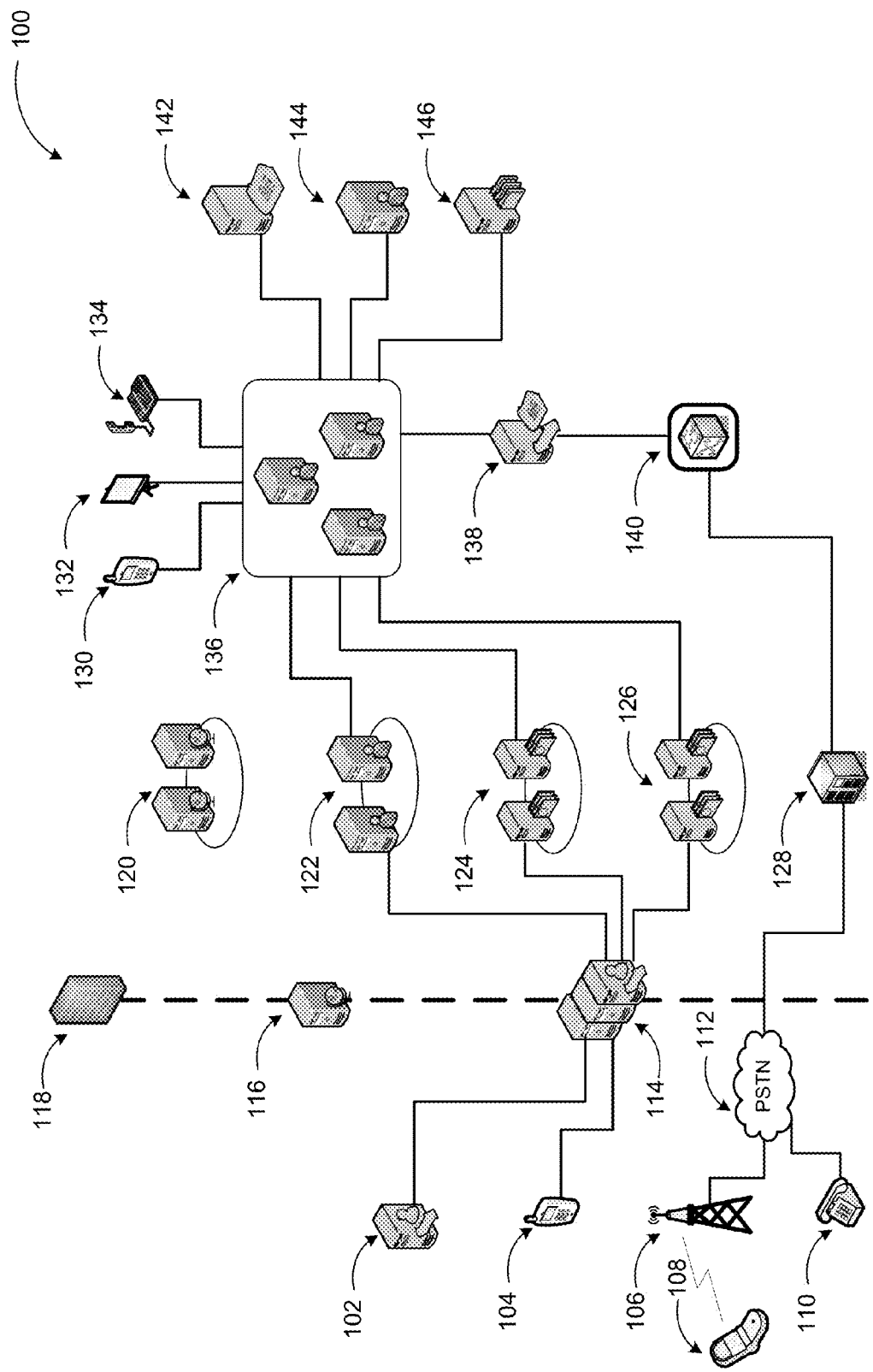
FIG. 1 is a diagram illustrating an example enhanced communications system such as a UC system, where embodiments may be implemented for managing distributed server systems through a structured data model.

As briefly described above, data associated with defining, deploying, and administering distributed server systems may be manipulated through a structured data model. System topology, configuration, and policies may be defined, distributed to components of the system, and modified as changes occur through the data model. In the following detailed description, references are made to the accompanying drawings that form a part hereof, and in which are shown by way of illustrations, specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing distributed server systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. The term "site" as used herein refers to a geographical location and may include data centers, branch offices, and similar communication sub-systems. Furthermore, the term cluster refers to a group of physical and/or virtual servers, which may provide the same service to a client in a transparent manner (i.e., the client sees a single server, while the cluster may have a plurality of servers).

FIG. 1 includes diagram 100 illustrating an example enhanced communications system such as a UC system, where embodiments may be implemented for managing distributed server systems through a structured data model. While unified communications and similar enhanced communication systems are discussed herein as example implementation platforms, embodiments are not limited to communication systems and can be implemented in any distributed server system. A unified communication (UC) system is an example of modern communication systems with a wide range of capabilities and services that can be provided to subscribers. A unified communication system is a real-time communications system facilitating email exchange, instant messaging, presence, audio-video conferencing, web conferencing, and similar functionalities.

In a unified communication (UC) system such as the one shown in diagram 100, users may communicate via a variety of end devices 130, 132, 134, which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through Private Branch Exchange (PBX) 128 to a Public Switched Telephone Network (PSTN) 112. Further communications through PSTN 112 may be established with a telephone 110 or cellular phone 108 via cellular network tower 106. End devices 130, 132, 134 may include any type of smart phone, cellular phone, any computing device executing a communication application, a smart automobile console, and advanced phone devices with additional functionality.

The UC system shown in diagram 100 may include a number of servers performing different tasks. For example, edge servers 114 may reside in a perimeter network and enables connectivity through UC network(s) with other users such as remote user 104 or federated server 102 (for providing connectivity with partner enterprise users through UC network(s)). A Hypertext Transfer Protocol (HTTP) reverse protocol proxy server 116 may also reside along the firewall 118 of the system. Edge servers 114 may be specialized for functionalities such as access, web conferencing, audio/video communications, and so on. Inside the firewall 118, a number of clusters for distinct functionalities may reside. The clusters may include web servers for communication services 120, director servers 122, web conferencing servers 124, and audio/video conferencing and/or application sharing servers 126. Depending on provided communication modalities and functionalities, fewer or additional clusters may also be included in the system.

The clusters of specialized servers may communicate with a pool of registrar and user services servers 136. The pool of registrar and user services servers 136 may also be referred to as a data center. A data center may be a place where any servers are closely located in a common area, regardless of what role of service those servers run. Thus, a data center is not limited to registrar and user services roles. A UC system may have one or more data centers, each of which may be at a different site. Registrar servers in the pool register end points 130, 132, and 134, and facilitate their communications through the system acting as home servers of the end points. User Services server(s) may provide presence and conferencing functionalities. Pool 136 may include a cluster of registrar servers. The registrar servers may act as backups to each other. The cluster of registrar servers may also have backup clusters in other data servers as described later.

Mediation server 138 mediates signaling and media to and from other types of networks such as a PSTN or a cellular network (e.g. calls through PBX 128) together with IP-PSTN gateway 140. Mediation server 138 may also act as a Session Initiation Protocol (SIP) user agent. In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method. SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

Additional components of the UC system may include messaging server 142 for processing voicemails and similar messages, application server 144 for specific applications like custom voice applications, and archiving server 146. Each of these may communicate with the data center pool of registrar and user services servers 136. Various components of the system may communicate using protocols like SIP, HTTP, and comparable ones.

As mentioned previously, UC system is a distributed server system. A platform for managing data associated with defining, deploying, and administering the UC system may utilize a single structured data model such as an XML document. The document may include a topology map defining hardware and software topology, assigned server roles, dependencies, and comparable parameters based on a common schema. The document may be used to validate the topology and replicate configuration to individual components of the system. A combination of central and remote services may be employed in validation and replication operations.

While the example system in FIG. 1 has been described with specific components such as registrar servers, mediation servers, A/V servers, and similar devices, embodiments are not limited to these components or system configurations and can be implemented with other system configuration employing fewer or additional components. Functionality of distributed server systems with a structured data model may also be distributed among the components of the systems differently depending on component capabilities and system configurations. Furthermore, embodiments are not limited to unified communication systems. The approaches discussed here may be applied to any data exchange network environment with distributed server using the principles described herein.

Figure 2:
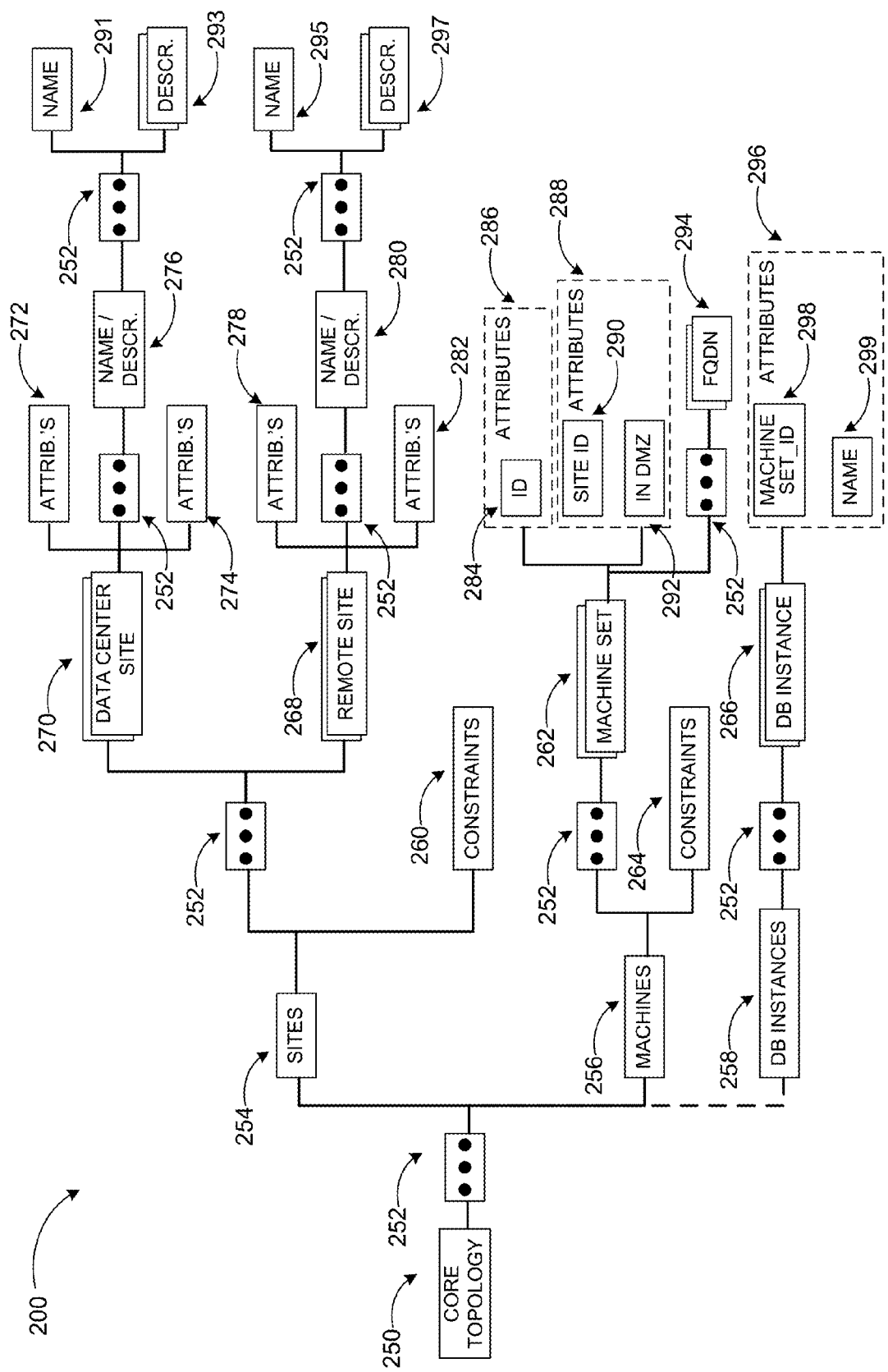
FIG. 2 illustrates an example data model for managing distributed server systems according to embodiments.

FIG. 2 illustrates an example data model 200 for managing distributed server systems according to embodiments. At the root of data model 200 is core topology 250, which includes top level information about the distributed server system. Throughout data model 200, multipliers 252 indicate branching of a hierarchy path into a plurality of paths such as multiple machines or sites branching out from core topology 250. A topology may have one or more clusters with each cluster having one or more machines. A topology may also have one or more services with each service being installed on an install point (cluster or database instance). These elements are shown and discussed in conjunction with FIG. 3.

Machines 256 represent hardware components such as servers, which may be assigned one or more roles. In the data model 200, machines 256 may include the definition of all machines in the deployment, their identifiers, which sites they reside in, their Fully Qualified Domain Name (FQDN) addresses, and comparable information. A distributed server system may include individual machines (e.g. servers), machine clusters, or sites (physically close clusters). Sites 254 in the data model may include the definition of all sites in the deployment, their identifiers, names, descriptions, and similar information.

A commonly found specific purpose component in distributed server systems is a database (e.g. an SQL database). Thus, data model 200 may also include database instances 258 defining database server instances in the deployment. Database instances 258 may be a child node of core topology 250 or a child node under each machine element. A database is an external element shown here as example. Other elements may also be modeled into the topology (such as file stores, third-party systems, etc). Sites 254 and machines 256 may each include a set of constraints child nodes (260 and 264) defining constraints associated with individual sites or machines. Under the machines 256 node, a plurality of machine set 262 child nodes may be found representing sets of one or more machines (e.g. clusters).

Each machine set 262 may include an identifier 284 as an attribute 286 and a site identifier 290 as attribute 288. Attribute 288 may include additional information associated with the machine set 262 such as whether the machine set is in the DMZ (demilitarized zone between firewalls) (292) and other information. The machine sets may also have a plurality of FQDNs 294 as child nodes. Database instances 258 branches into a plurality of single database instance 266 nodes. Attributes 296 of the single database instance elements may include a machine set identifier 298 and a name 299.

Sites 254 may branch into a plurality of remote site 268 nodes and data center site 270 nodes. Remote sites typically include fewer machines and fewer capabilities than a data center. They are also referred to as branch offices. Any system needs to have at least one data center site, but may have none or multiple remote sites. Data center site 270 may have child nodes attributes 272, 274 and name and optional description of site elements 276. Each name and optional description of site element 276 may branch into a name child node (291) and a description child node (293). Similarly, remote site element may have child nodes attributes 282, 278 and name and optional description of site elements 280. Each name and optional description of site element 280 of the remote sites may branch into a name child node (295) and a description child node (297).

In addition to describing the topology, the data model 200 may also describe the settings for servers and policies applicable to users such as preference policies. Characteristics of the setting, policies and a resolution for the system may be scoped at different scopes such as a global, site, service (or cluster), user, or groups of users, etc. Scopes are anchor points at which different settings or policies can be defined. Different resolution mechanisms can also be defined and stored in the system through scopes. For example, one mechanism may be "the most specialized", i.e. if there is a policy/setting document at the most specialized scope it overrides a generalized one (e.g. tag documents take precedence over service over site over global). Other resolutions may include "most generalized" or a combination of the generalized/specialized mechanism. In a system according to embodiments, global/site/service/tag scopes may be available, and closest policy/configuration to the service/user entity may prevail. However, embodiments are not limited to the example scopes and resolutions discussed here. Many other types may be implemented through a resolution scheme that may be defined and stored per policy.

Configuration/policy metadata may define the supported scopes along with the schema of the actual data. Whenever an administrator creates an instance of a configuration/policy, it may define a scope (i.e., at which scope this configuration/policy applies) along with the actual configuration/policy data. Thus, scopes may be used for everything that is outside the topology such as users, contacts, groups, DLs, OUs, tenants, etc. Some example scopes are described below for illustration purposes.

Configuration/Policy defined at a "global" scope may apply to all server entities and users unless overridden by scopes associated with smaller coverage. The global scope is by definition a singleton. For example, a system can only have one global instance of "Meeting Policy". However, the data of this singleton may be modified.

"Site" scope comes from topology. An administrator may define multiple different sites depending on the physical location of their resources such as "Dublin", "Singapore", "Tukwila" etc. If the administrator wishes to set one particular meeting policy to "Tukwila" site, it can create a "Meeting Policy" instance with "Tukwila" site scope. This new meeting policy overrides the global policy (if any) for the "Tukwila" site. The rest of the sites may still use the global "Meeting Policy" (if any).

"Service" scope may also come from topology. For example, there may be three registrar pools in "Tukwila" site and the administrator may wish to change the "Meeting Policy" applied to only Pool1. The administrator may create a meeting policy with service scoped to Pool1. This new policy overrides the "Tukwila" site scope "Meeting Policy" for Pool1. As a result, Pool1 starts using this new "Meeting Policy" whereas other pools in "Tukwila" site may still use the "Meeting Policy" created for "Tukwila" site.

"Tag" is an example of a named scope. An administrator may create multiple different named "Meeting Policy" instances with different attributes such as "Low Meeting Policy", "Medium Meeting Policy", "High Meeting Policy." By creating these entities alone does not make the policies useful, because they do not have any identity to be applied yet. Once the policies are assigned to a user they may override other "Meeting Policy" instances scoped at higher levels (if any). It should be noted, the infrastructure may specify a static default instance. Thus, if the administrator does not want to create any policy instance, all server/user entities by default may use the default instance. Once again, though, the example scopes and resolutions discussed above are for illustration only, and other scopes, scope levels, policies, and resolutions may be implemented in a distributed server environment according to embodiments.

Figure 3:
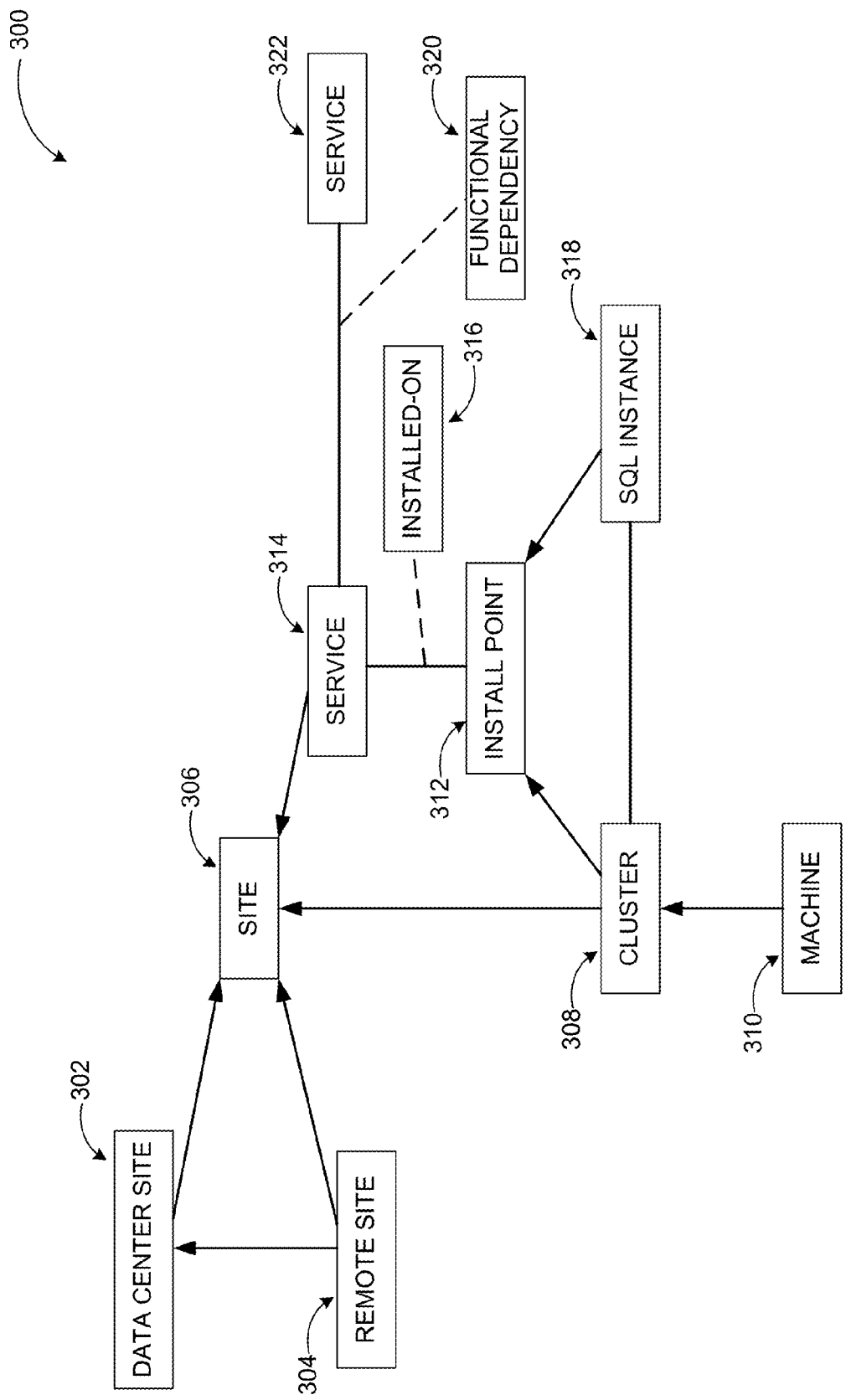
FIG. 3 illustrates relationships between components of an example distributed server system employing a structured data model for definition, deployment, and administration according to embodiments.

FIG. 3 illustrates relationships between components of an example distributed server system employing a structured data model for definition, deployment, and administration according to embodiments. As shown in diagram 300, remote sites 304 are operationally connected to a data center site 302, which is reflected in the data model. Both remote site 304 and data center site 302 are under the top level category site 306.

A site 306 includes one or more machine 310 and cluster 308 depending on the configuration. Each cluster 308 may be associated with a database instance (e.g. SQL instance) 318. Topology and configuration information of cluster 308 and database instance 318 may be defined at install point 312, which is associated with a service 314. Thus, an installed-on element 316 may identify a particular install point to be associated with a particular service (e.g. install point 312 on service 314). In a system with multiple services (e.g. service 314 and service 322), functional dependencies 320 may be defined between the associated services as well.

The configuration for the system may define operating rules, physical or virtual hardware configurations, and similar parameters. In a system according to embodiments, the configuration may be validated prior to deployment. In a single tenant environment, policies are typically defined by central service and they are applied globally. In a multi-tenant environment, however, each tenant may wish to have their own set of policies. In a system according to embodiments, each of the tenants in a multi-tenant environment may be enabled to set policies through an authorization mechanism.

Figure 4:
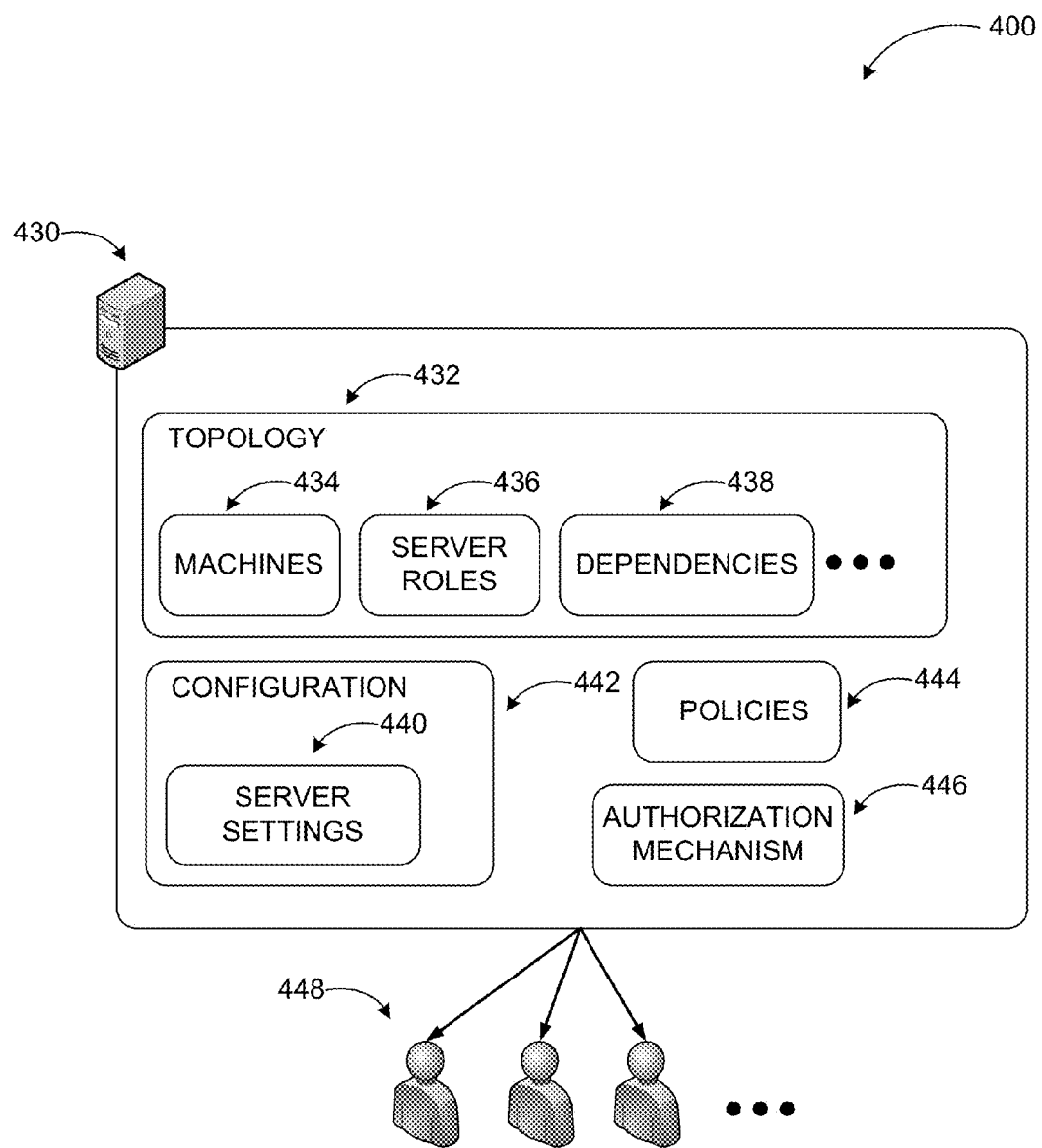
FIG. 4 is a conceptual diagram illustrating major aspects of an example distributed server system employing a structured data model for definition, deployment, and administration.

FIG. 4 is a conceptual diagram illustrating major aspects of an example distributed server system employing a structured data model for definition, deployment, and administration. Diagram 400 summarizes major elements of a system according to embodiments in a distributed server system.

Using a structured data model, a central management server (or cluster) 430 may define topology 432 with machines 434, server roles 436 for individual machines, dependencies, and similar topology parameters. The central management server 430 may further define configuration 442 with server settings 440, policies 444 for users, and authorization mechanism 446 if the system includes a multi-tenant environment.

The defined topology, configuration, and policies may be validated, deployed to the entire system (through replication), and administered (e.g. changes replicated to the machines) such that desired services can be provided to users 448 of the system. The system definition may be created and maintained in a single or multiple structured document such as an XML document and replication performed by tailoring relevant portions of the document to individual machines that need to be synchronized.

The example systems in FIG. 1 through 4 have been described with specific components such as registrar servers, communication servers, directory servers, presence servers, and the like. Embodiments are not limited to distributed server systems according to these example configurations. Furthermore, specific protocols are described for communication between different components. Embodiments are also not limited to the example protocols discussed above, and may be implemented using protocols, components, and configurations other than those illustrated herein employing fewer or additional components and performing other tasks.

Figure 5:
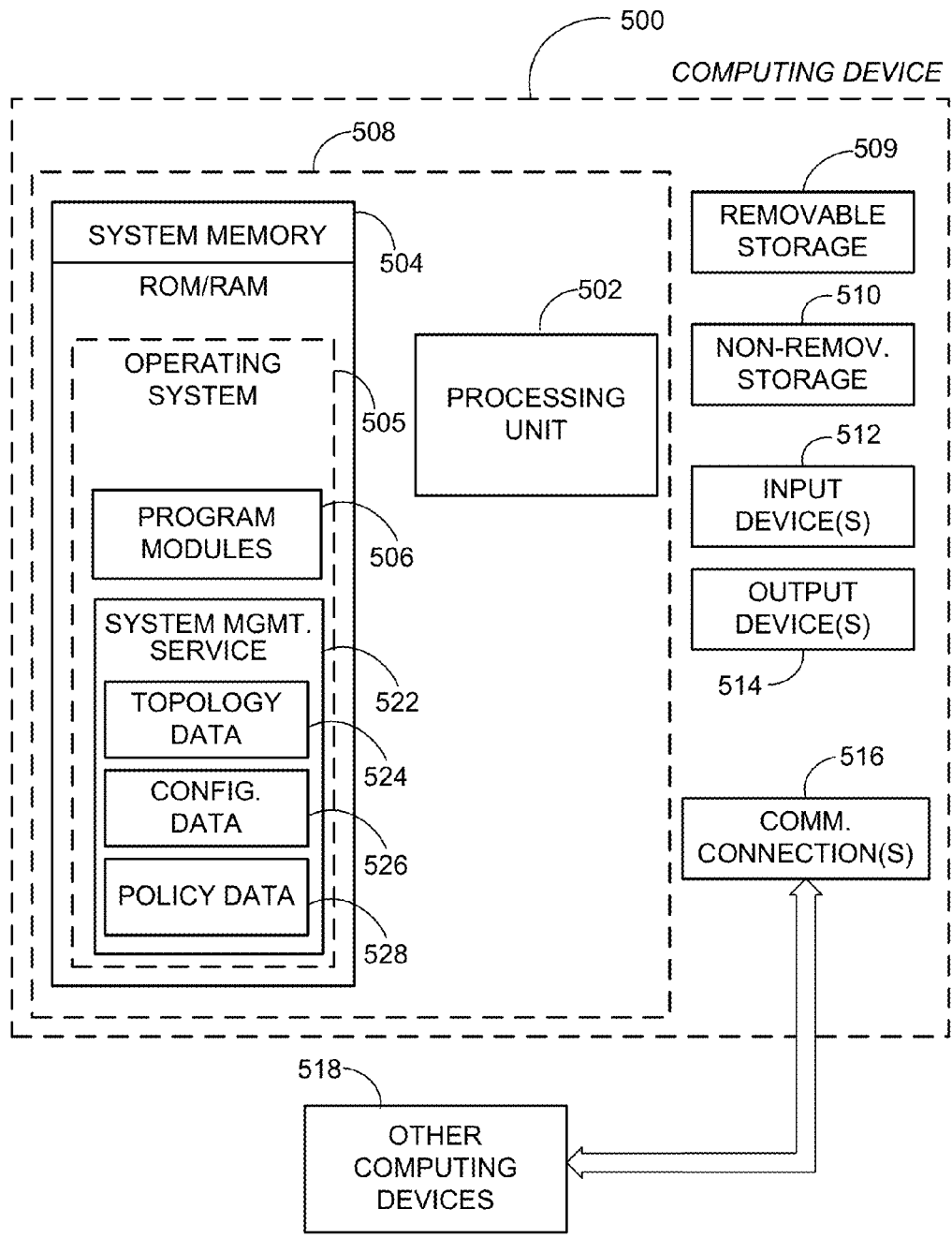
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server within a distributed server system and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506 and system management service 522 with topology data 524, configuration data 526, and policy data 528.

System management service 522 may define, deploy, and administer a distributed server system through a structured data model utilizing a flexible replication mechanism, a set of schemas, and an object model to manipulate system topology, configuration (settings), and policies as discussed previously. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, other directory or policy servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
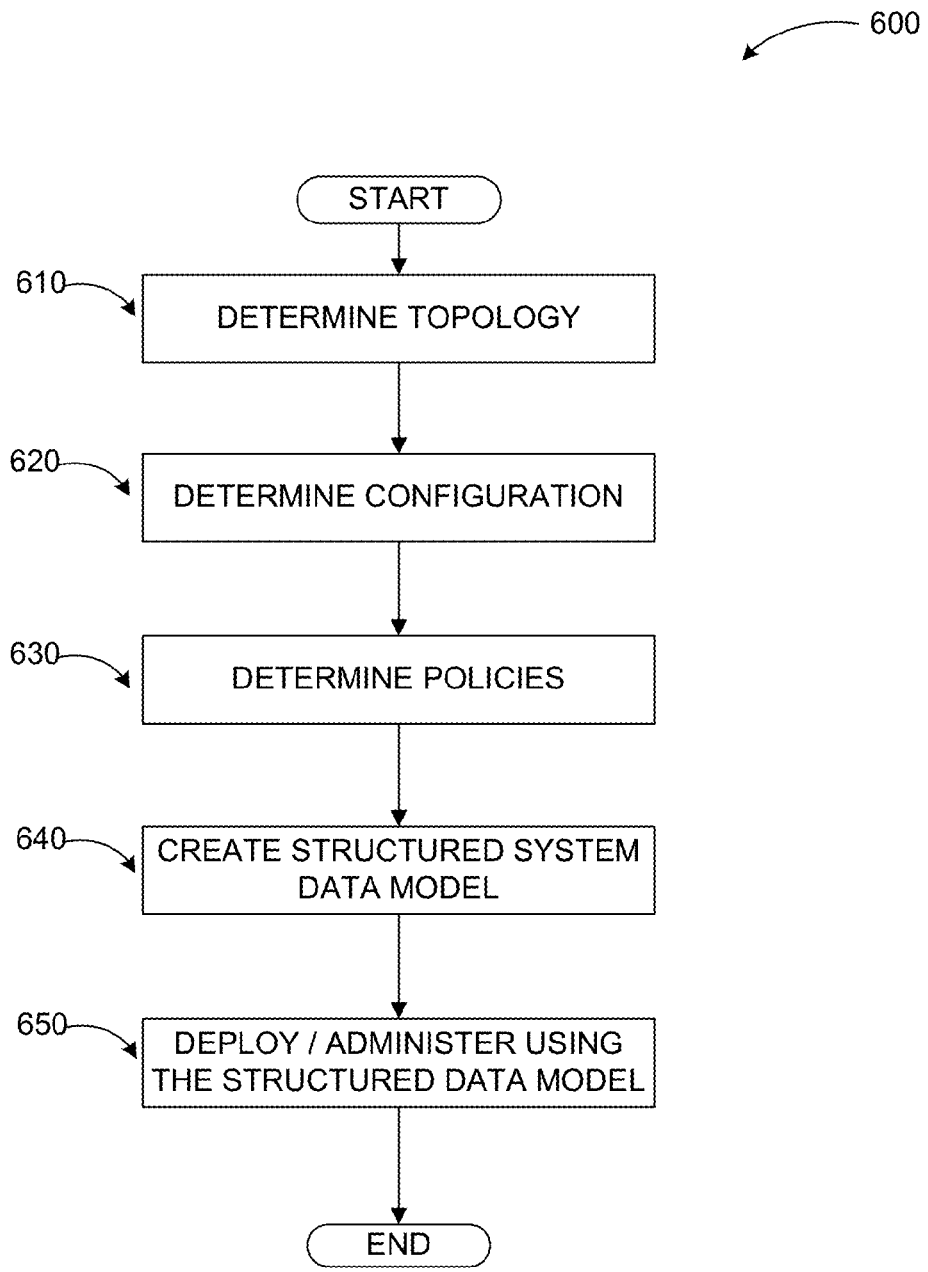
FIG. 6 illustrates a logic flow diagram for a process of managing a distributed server system through a structured data model according to embodiments.

FIG. 6 illustrates a logic flow diagram for process 600 of managing a distributed server system through a structured data model according to embodiments. Process 600 may be implemented as part of an enhanced communication or similar system.

Process 600 begins with operation 610, where a topology of the distributed server system may be determined. The topology may define which machines are involved, which server roles are installed on each machine (a machine may include multiple roles), dependencies, and similar parameters. At operation 620, a configuration of the system may be determined. The configuration may specify settings for servers such as non-user specific service rules. At operation 630, policies may be determined. Policies apply to users of the system. For example, preference policies for users may be defined as default policies at global, site, server, or user level. According to some embodiments, global/site/service scopes may be employed using anchors provided by topology. For example, an administrator may create a "Limited Meeting Policy" and assign this to a user directly.

At operation 640, a structured data model reflecting the topology, configuration, and policies may be created and used to deploy and administer the distributed server system at operation 650.

The operations included in process 600 are for illustration purposes. A structured data model for defining, deploying, and administering distributed server systems according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for deployment and administration of distributed server systems, the method comprising:
   determining a topology of a distributed server system employing a system management service;
   determining a configuration of the distributed server system;
   determining a set of policies associated with the distributed server system;
   defining one or more characteristics of the configuration, the set of policies, and a resolution of the distributed server system employing a scoping mechanism to scope the one or more characteristics of the configuration, the set of policies, and the resolution,
   wherein a scope, ranging from a more generalized scope to a more specialized scope, is one of a global scope, a site scope, a service scope, and a tag scope employed using anchors provided by the topology, and
   wherein the scoping mechanism is one of: a most specialized mechanism, wherein the more specialized scope overrides the more generalized scope; a most generalized mechanism, wherein the more generalized scope overrides the more specialized scope; and a combination of the most specialized and the most generalized mechanism;
   creating a structured data model as a document including a topology map specifying hardware and software topology, assigned server roles, dependencies, and parameters based on a common schema to define the topology, configuration, and policy of the distributed server system, wherein a core topology at a root of the data model includes top level information about the distributed server system, multipliers associated with the core topology indicate branching of a hierarchy path into a plurality of paths including one or more sites, one or more machines, and one or more clusters in the distributed server system, and the data model includes a machines node defining identifiers, sites, and network addresses of the one or more machines in the system;
   employing an object model to manipulate the topology, including hardware and software topology, configuration, and policy of the distributed server system at the system management service; and
   deploying the distributed server system to individual machines of the distributed server system utilizing a flexible replication mechanism based on replication of the structured data model, wherein the individual machines are one or more of: servers, machine clusters, and sites of physically close clusters.

2. The method of claim 1, wherein the topology specifies at least one from a set of: a number and an identifier of each machine in the system, and at least one role assigned to each machine in the system.

3. The method of claim 1, wherein the configuration specifies at least one from a set of: a setting for each server in the system, and an operating rule.

4. The method of claim 1, wherein the policies apply to users.

5. The method of claim 4, wherein a plurality of tags define policies assigned to users.

6. The method of claim 1, wherein the system is a multi-tenant system, and the method further comprises:
   enabling each tenant to define distinct policies for their respective users by employing an authorization mechanism.

7. The method of claim 1, further comprising:
   validating at least one of the topology and the configuration prior to deployment.

8. The method of claim 1, further comprising:
   administering the distributed server system based on replicating modifications to at least one from a set of: the topology, the configuration, and the policy to the machines of the system.

9. The method of claim 8, wherein the modifications are replicated by: tailoring the data model to each machine based on a status of each machine and a current status of the system.

10. The method of claim 1, wherein the document is a single structured document.

11. The method of claim 10, wherein the single structured document is an extensible markup language (XML) document.

12. A computing device for deployment and administration of distributed server systems, the computing device comprising:
  a memory storing instructions; and
  a processor coupled to the memory, the processor executing a system management service application in conjunction with the instructions stored in the memory, wherein the system management service application is configured to:
    determine a topology of a distributed server system, a configuration of the distributed server system, and a set of policies associated with the distributed server system;
    define one or more characteristics of the configuration, the set of policies, and a resolution of the distributed server system employing a scoping mechanism to scope the one or more characteristics of the configuration, the set of policies, and the resolution,
      wherein a scope, ranging from a more generalized scope to a more specialized scope, is one of a global scope, a site scope, a service scope, and a tag scope employed using anchors provided by the topology, and
      wherein the scoping mechanism is one of: a most specialized mechanism, wherein the more specialized scope overrides the more generalized scope; a most generalized mechanism, wherein the more generalized scope overrides the more specialized scope; and a combination of the most specialized and the most generalized mechanism;
    further define one or more characteristics of the set of policies employing an authorization mechanism, wherein the authorization mechanism enables definition of distinct policies for respective users;
    create a structured data model as a document including a topology map specifying hardware and software topology, assigned server roles, dependencies, and parameters based on a common schema to define the topology, configuration, and policy of the distributed server system;
    employ an object model to manipulate the topology, including hardware and software topology, configuration, and policy of the distributed server system at the system management service;
    deploy the distributed server system to individual machines of the distributed server system utilizing a flexible replication mechanism based on replication of the structured data model, wherein the individual machines are one or more of: servers, machine clusters, and sites of physically close clusters; and
    administer the distributed server system based on replicating modifications to at least one from a set of: the topology, the configuration, and the policy to the machines of the system.

13. The computing device of claim 12, wherein the structured data model includes a core topology node branching to a sites node defining identifiers, names, and descriptions of one or more sites in the distributed server system, and a machines node defining identifiers, sites, and network addresses of the machines in the system.

14. The computing device of claim 13, wherein the structured data model further includes a plurality of machine set nodes under the machines node defining attributes of individual machines in each machine set.

15. The computing device of claim 13, wherein the structured data model further includes at least one data center site node and a remote site node under the sites node branching into names and descriptions of elements of each site.

16. The computing device of claim 13, wherein the structured data model further includes a database instances node under the core topology node defining database instances associated with each machine of the system.

17. The computing device of claim 12, wherein the distributed server system is a unified communication system facilitating multi-modal communications and providing associated services.

* * * * *